(12) United States Patent
Lim

(10) Patent No.: US 7,761,108 B2
(45) Date of Patent: Jul. 20, 2010

(54) PROVIDING TALK BURST AUTHORITY IN GROUP COMMUNICATION SYSTEM SUPPORTING PTT SERVICE

(75) Inventor: Guk-Chan Lim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 782 days.

(21) Appl. No.: 11/191,443

(22) Filed: Jul. 27, 2005

(65) Prior Publication Data

US 2006/0035657 A1    Feb. 16, 2006

Related U.S. Application Data

(60) Provisional application No. 60/591,602, filed on Jul. 28, 2004.

(30) Foreign Application Priority Data

Jun. 18, 2005    (KR) .................. 10-2005-0052748

(51) Int. Cl.
| H04B 7/00 | (2006.01) |
| H04W 40/00 | (2009.01) |
| H04W 4/00 | (2009.01) |
| H04L 12/28 | (2006.01) |
| H04L 12/56 | (2006.01) |
| G06F 15/16 | (2006.01) |

(52) U.S. Cl. .................. 455/518; 455/445; 455/519; 455/520; 455/521; 370/328; 370/341; 370/389; 709/235; 709/248

(58) Field of Classification Search .............. 455/90.2, 455/79, 67.14, 573, 572, 567, 561, 522, 518, 455/519, 520, 521, 517, 515, 512, 509, 458, 455/455, 456.1, 452.1, 452.2, 426.1, 452, 455/11.1, 88, 423, 445, 454, 508, 514, 527; 370/260, 312, 328, 347, 350, 352, 432, 401, 370/462, 389, 341, 315, 332, 337, 338, 339, 370/346–348, 362, 392, 447, 449, 455, 459, 370/230, 235, 238, 270, 320, 349, 412, 444; 709/248, 235; 340/10.2
See application file for complete search history.

(56) References Cited

U.S. PATENT DOCUMENTS

| 5,960,362 A | * | 9/1999 | Grob et al. ................. 455/527 |
| 6,023,626 A | * | 2/2000 | Kinnunen et al. ........... 455/512 |
| 6,301,263 B1 | * | 10/2001 | Maggenti .................... 370/462 |

(Continued)

FOREIGN PATENT DOCUMENTS

JP    2001-188740    7/2001

(Continued)

Primary Examiner—Nay A Maung
Assistant Examiner—Paul P Tran
(74) Attorney, Agent, or Firm—Lee, Hong, Degerman, Kang & Waimey

(57) ABSTRACT

A method for managing a talk burst in a PTT service system comprises: allocating, by a PTT server, master authority to a particular PTT client; and controlling, by the PTT server, another PTT clients according to a talk burst management procedure selected by the PTT client having the master authority. The PTT server allocates the master authority to the PTT client initiating a session and the PTT client having the master authority freely controls the talk burst management procedure, so that session establishment can be smoothly controlled.

9 Claims, 2 Drawing Sheets

U.S. PATENT DOCUMENTS

| | | |
|---|---|---|
| 6,449,491 B1 | 9/2002 | Dailey |
| 6,594,247 B2 * | 7/2003 | Perkins et al. ............... 370/341 |
| 7,035,658 B2 * | 4/2006 | Drozt et al. ................. 455/519 |
| 7,079,857 B2 * | 7/2006 | Maggenti et al. ............ 370/447 |
| 7,558,736 B2 * | 7/2009 | Thalanany et al. .......... 704/275 |
| 2002/0150091 A1 * | 10/2002 | Lopponen et al. ........... 370/389 |
| 2003/0153343 A1 * | 8/2003 | Crockett et al. ............. 455/519 |
| 2003/0235184 A1 * | 12/2003 | Dorenbosch et al. ........ 370/352 |
| 2004/0071099 A1 | 4/2004 | Costa-Requena et al. |
| 2004/0082352 A1 * | 4/2004 | Keating et al. .............. 455/519 |
| 2004/0127233 A1 | 7/2004 | Harris et al. |
| 2005/0002407 A1 * | 1/2005 | Shaheen et al. ............. 370/401 |
| 2005/0124365 A1 | 6/2005 | Balasuriya et al. |
| 2005/0143135 A1 | 6/2005 | Brems et al. |
| 2005/0176454 A1 | 8/2005 | Chakraborty et al. |
| 2005/0239486 A1 | 10/2005 | D'Avello et al. |
| 2006/0002328 A1 * | 1/2006 | Naghian ..................... 370/328 |

FOREIGN PATENT DOCUMENTS

| | | |
|---|---|---|
| WO | WO 00/40045 | 7/2000 |
| WO | WO 00/57656 | 9/2000 |
| WO | WO 0167675 | 9/2001 |
| WO | WO 02/085051 A1 | 10/2002 |
| WO | WO 03/069926 A1 | 8/2003 |

* cited by examiner

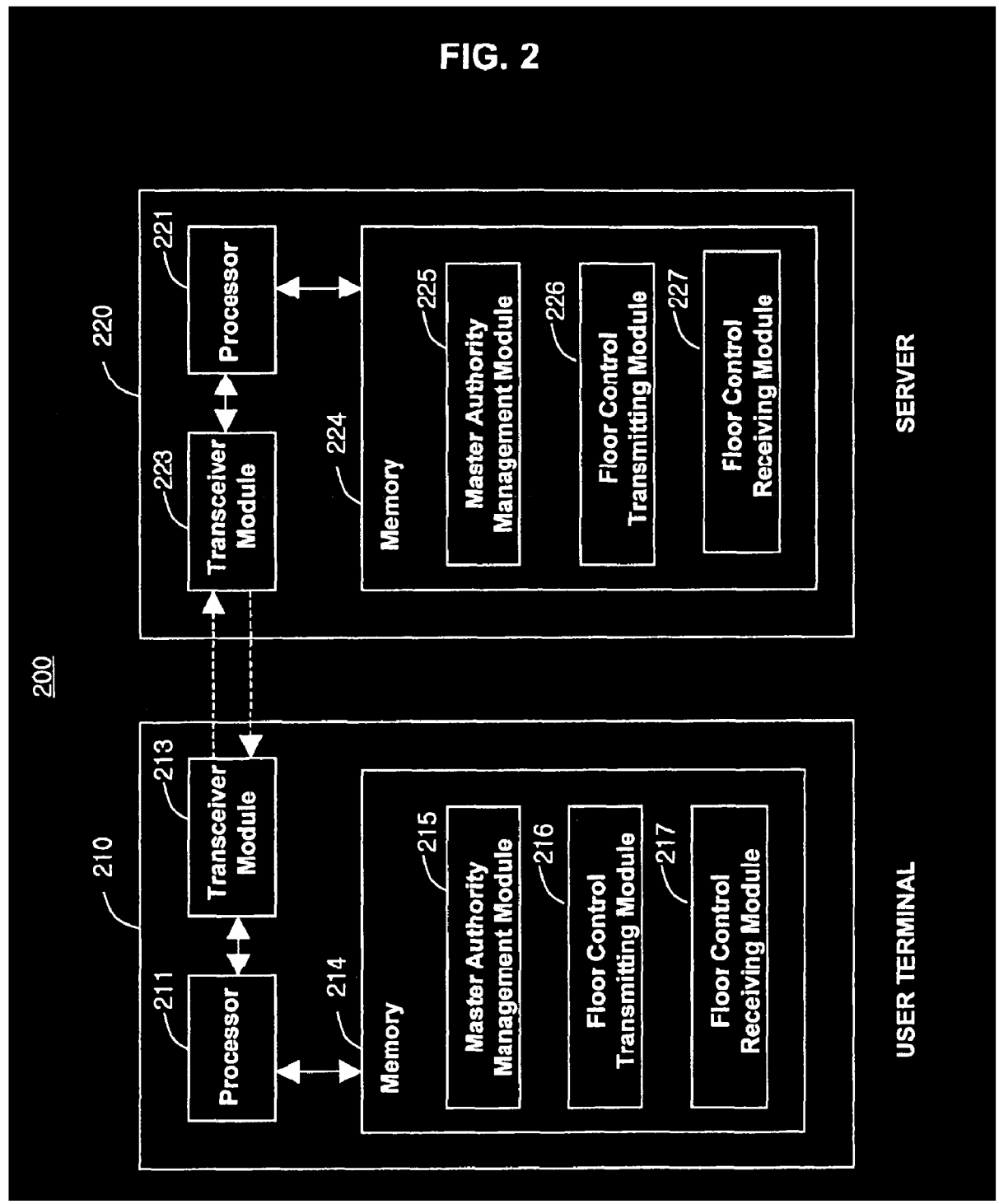

PROVIDING TALK BURST AUTHORITY IN GROUP COMMUNICATION SYSTEM SUPPORTING PTT SERVICE

CROSS-REFERENCE TO RELATED APPLICATIONS

This application claims the benefit of earlier filing date and right of priority to U.S. Provisional Application No. 60/591,602 and Korean Application No. 10-2005-0052748, filed on Jul. 28, 2004 and Jun. 18, 2005, respectively, the contents of which are hereby incorporated by reference herein in their entirety.

BACKGROUND OF THE INVENTION

1. Field of the Invention

The present invention relates to a PTT service system, and particularly, to a method for managing a talk burst (e.g., right to talk, privilege to speak, floor request) in a PTT service system in which a particular PTT terminal having a master function controls the talk bursts.

2. Description of the Background Art

A PTT (Push-To-Talk) service is a half-duple communication technique that grants a talk burst (i.e., floor grant, permission to talk, etc.) to only one user at a time, and provides one-to-one or one-to-many communication according to a user's selection. Here, a user that has been granted the right to talk is said to have been granted the "floor" or granted a "talk burst", and these expressions can thus be used interchangeably.

In one-to-many communication, a PTT service providing voice communication is shared between a plurality of users to talk to. If a particular user selects a plurality of users or a group and presses a PTT key, a session is formed between PTT terminals through a PTT server, and the all selected recipients participate in the session and can transmit/receive voice data.

Every PTT terminal having a session established therefor can perform a PTT communication but must take a talk burst in order to transmit voice data. The PTT server controls the talk burst such that only one user among the users participating in the session can transmit voice data.

As described, since the PTT server performs talk burst control of the PTT service in accordance with the conventional art, when a talk burst is allocated to a particular user, another user cannot take a talk burst until the talk burst is released.

In addition, in the conventional talk burst management, in order to exclude a user monopolizing a talk burst or a user speaking unnecessary language from a group chat, it is inconvenient for the user to perform a procedure in which the user terminates the PTT communication, releases the session, re-establishes a group and establishes a session again.

BRIEF DESCRIPTION OF THE INVENTION

Therefore, an object of the present invention is to provide a method for managing a talk burst in a PTT service system in which master authority capable of controlling a talk burst management procedure is given to a particular user in order to smoothly manage the talk burst.

To achieve these and other advantages and in accordance with the purpose of the present invention, as embodied and broadly described herein, there is provided a method for managing a talk burst in a PTT service system in which one or more PTT clients establish a session through a PTT server, comprising: allocating, by a PTT server, master authority to a particular PTT client; and controlling, by the PTT server, a talk burst with respect to the clients having a session established therefor according to the determined talk burst management procedure.

To achieve these and other advantages and in accordance with the purpose of the present invention, as embodied and broadly described herein, there is provided a method for managing a talk burst in a PTT service system, comprising: inviting, by a particular PTT client, one or more another PTT clients; allocating, by a PTT server, master authority to the PTT client initiating the invitations; determining a talk burst management procedure by the PTT client having the master authority; and controlling, by the PTT server, a talk burst with respect to the clients between which a session is established according to the determined talk burst management procedure.

The present invention provides a server of a group communication system, comprising: a transceiver to send and receive communication signals; a processor cooperating with the transceiver; and a storage medium containing instructions executable by the processor to perform the steps of, providing master authority to a particular user terminal, receiving floor control commands from the particular user terminal to handle floor control procedures for other user terminals having a session established thereof, and sending the floor control commands to the other terminals to perform floor control procedures.

The master authority can be provided to the particular user terminal that requested session establishment with other user terminals. Here, the floor control procedures can include providing floor grants and floor denials to one or more other user terminals, and the floor control procedures allow fair access to multiple user terminals. Also, the master authority can be transferred from the particular user terminal to a different user terminal, and the transferred master authority can be released and returned to the particular user terminal. Additionally, the group communication system supports a push-to-talk function.

Also, the present invention provides a user terminal of a group communication system, comprising: a transceiver to send and receive communication signals; a processor cooperating with the transceiver; and a storage medium containing instructions executable by the processor to perform the steps of, receiving master authority from a server and sending floor control commands to other user terminals via the server to handle floor control procedures for other user terminals having a session established thereof, or receiving floor control commands via the server from another user terminal that has been given master authority from the server.

The master authority can be received after requesting session establishment with other user terminals. The floor control procedures can include receiving floor grants and floor denials from the server, and the floor control procedures can allow fair access to multiple user terminals. Also, the received master authority can be transferred to a different user terminal, and the transferred master authority can be released and returned from the different user terminal. Additionally, the group communication system supports a push-to-talk function.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 depicts a group communication system showing a server and a single user terminal according to the present invention, although many user terminals may be employed.

DETAILED DESCRIPTION OF THE INVENTION

Figure 1:
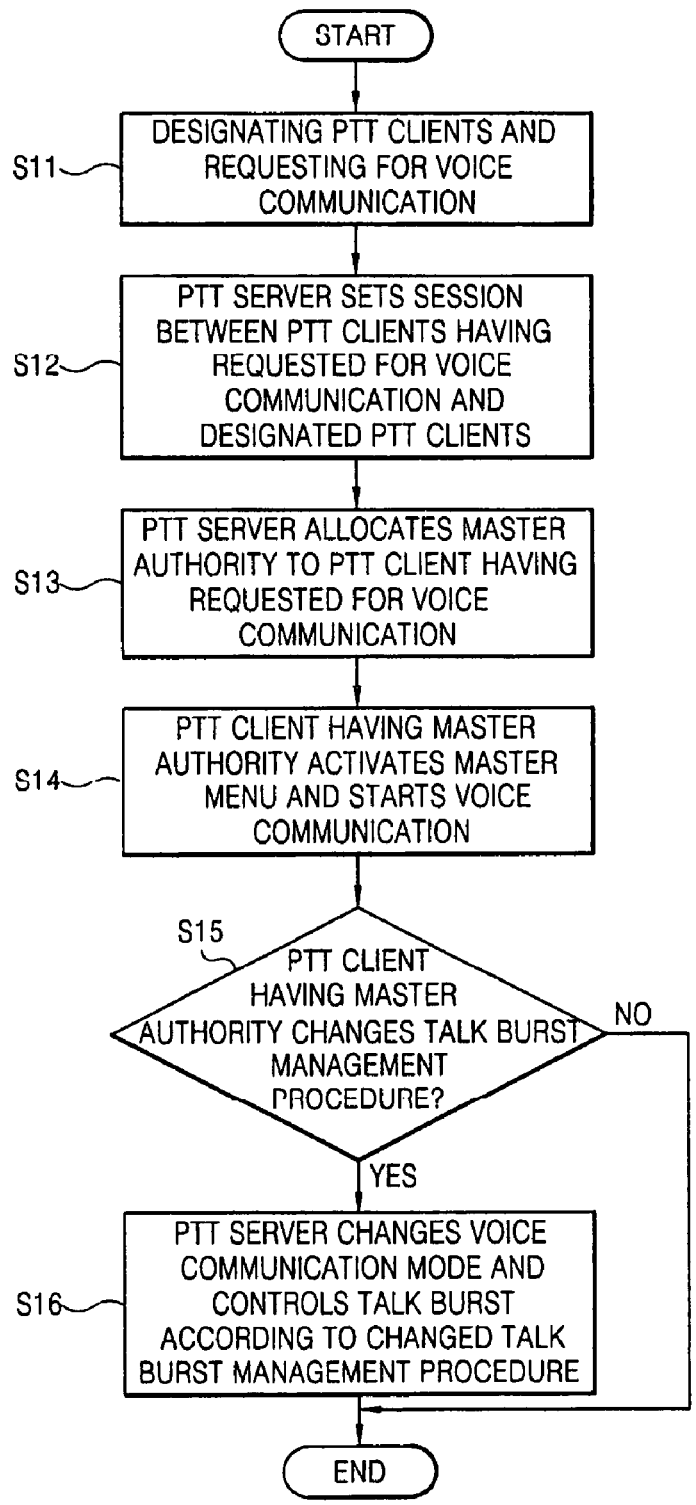
FIG. 1 is a flowchart illustrating a method for managing a talk burst in accordance with the present invention.

Hereafter, some preferred embodiments of the present invention will be explained in detail by referring to the accompanying drawings. In the following description, some well-known functions or constructions are not described in detail because doing so may obscure the invention in unnecessary detail. Several exemplary embodiments of the present invention that may be used separately or in any combination to achieve talk burst allocation will be described in more detail hereafter.

Push-To-Talk, commonly abbreviated as PTT, is a method of conversing on half-duplex communication lines by pushing a button to allow voice communication to be transmitted and releasing the button to allow voice communication to be received. Such PTT features are being implemented in recent mobile terminals (e.g., mobile phones, handsets, wireless devices, etc.), allowing a mobile terminal to function as a digital two-way radio (e.g., a walkie-talkie) in push-to-talk operation. One person at a time can talk by pressing a PTT button and one or several others can listen instantly. Certain PTT schemes are based on 2.5 G packet-switched networks (e.g., CDMA, GPRS, etc.) and use particular protocols, namely, SIP (Session Initiation Protocol) and RTP (Real Time Transport Protocol). These particular versions of PTT are called "Push-To-Talk over Cellular" (or Push-over-Cellular), commonly abbreviated as PoC.

As cellular communication networks continue to evolve and accommodate the transferring of various types of data (voice, images, audio, video, multimedia, etc.), various Internet access technologies are being employed. An example would be the Internet Protocol (IP), which is a data-oriented protocol used by source and destination hosts for communicating data across a packet-switched network (e.g., the Internet), and examples include IPv4, IPv6, and the like.

Among the numerous features of PTT (including a particular type of PTT called PoC), the floor control procedures related to a server (e.g., a PTT server) and a client (e.g., a PTT client) will be considered hereafter. In particular, the server can be considered as a centralized point that grants a "floor" to a PTT user who wishes to speak to a talk group. Namely, a user can "take the floor" and speak to other users who can only listen during that time. The client includes various mechanisms to facilitate the priority allocation required in granting the floor to the user.

When multiple users wish to take the floor (in order to talk with other users) by respectively sending a transmission request (e.g., a floor request, a talk burst request, etc.), priorities should be allocated such that the users take turns in speaking by considering whether their transmission requests that have been granted or denied. For example, the priorities may be allocated on a first come first served basis. For each transmission request from each client, the server may either grant or deny each request based upon the communications environment or other factors thereof.

In the present invention, talk burst allocation can also be referred to as obtaining the right to talk (or right to speak) or obtaining permission to transmit (access request). A user that is granted the right to talk is said to have been granted the "floor" or granted a "talk burst", and these expressions can be used interchangeably.

In the present invention, master authority with which a talk burst can be managed is given to a particular user, and a PTT server controls the talk burst according to a talk burst managing procedure selected by the user having the master authority.

FIG. 1 is a flowchart illustrating a method for managing a talk burst in accordance with the present invention. A particular user designates two or more users to talk to or a group by a PTT client and then requests for a group chat (S11), a PTT server establishes a session for a PTT service with the selected PTT client (S12), and gives master authority for talk burst management to the PTT client having requested for the group chat (S13). Here, a "session" refers to a communications relationship or link between two or more user devices (e.g., PTT terminals) during which voice and data can be sent and received. At this time, the PTT client having been given the master authority activates a master menu which is embedded in itself or is received from the PTT server (S14).

If each user presses a PTT key and requests for a talk burst in the session, the PTT server allocates the talk burst to one PTT client among the PTT clients having requested for the talk burst. In general, the PTT server allocates the talk burst to the PTT client having requested for the group chat.

If the user changes a talk burst management procedure through the PTT client having the master authority (S15), the PTT server changes a group chat mode to the changed talk burst management procedure and controls the talk burst according to the changed management procedure (S16).

A talk burst management procedure which the PTT client having the master authority can choose is as follows: a procedure that automatically allocates a talk burst once to each user having a session established therefor, a procedure that automatically releases a talk burst when the talk burst is monopolized over a particular period of time, a procedure that forbids a talk burst of a particular user, a procedure that transfers master authority to another user, a procedure by which a user having a master function forcibly releases a talk burst of another user or has priority with respect to the next talk burst when the user having the master function has a message to be urgently sent, or the like. The PTT client having the master authority may give talk burst priority to another PTT clients participating in a session. All of the above are mere examples of various talk burst management (floor control) procedures that can guarantee fair access for multiple users (PTT clients, user terminals, etc.), and many other types of procedures may also possible and intended to be handled by the present invention.

An operation of a PTT service system to which a method for managing a talk burst in accordance with the present invention is applied will be described in detail.

First, the PTT service system includes first to fourth PTT clients and a PTT server for establishing a session between the PTT clients and controlling a talk burst. In addition, it is assumed that the first PTT client selects the second to fourth PTT clients as clients to talk to and requests for a talk burst.

If the first PTT client sends an invite message (i.e., floor invite) to the PTT server, the PTT server performs initialization for voice communication and then gives master authority for talk burst management to the first PTT client. The PTT server sends invite messages to the second to fourth PTT clients which are selected by the first PTT client.

The first PTT client having the master authority activates a master menu which is embedded in a terminal or is downloaded from the PTT server. The second PTT client, the third PTT client and the fourth PTT client having received the invite messages from the PTT server individually determine whether or not to accept the invitations. At this time, if the PTT client accepts the invitation, an OK signal is transmitted to the PTT server. If the PTT client does not accept the invitation, a NOK signal is transmitted to the PTT server.

The first PTT client having the master authority activates the master menu, sends a message for controlling various operations of the voice communication to the PTT server or determines a talk burst management procedure, and takes authority to send the determined talk burst management procedure to the PTT server.

For example, the first PTT client having the master authority determines a procedure that allocates a talk burst with respect to the second PTT client, the third PTT client and the fourth PTT client having a session established therefor. The first PTT client can release a talk burst of a PTT client monopolizing the talk burst over a particular period of time or forbid a talk burst with respect to a particular PTT client.

In addition, when the first PTT client having the master authority completes a session, the first PTT client transfers its master authority to another PTT client. While another PTT client has a talk burst, if the first PTT client having the master authority urgently needs to send a message, the first PTT client having the master authority may forcibly release the talk burst allocated to said another PTT client.

The first PTT client instructs the PTT server about the talk burst management procedure, and the PTT server performs an operation according to the changed talk burst management procedure such as changing a procedure that allocates a talk burst by changing a voice communication mode, releasing a talk burst of a PTT client, allocating master authority to another PTT client, or the like.

As described so far, as master authority is allocated to a particular PTT client and the PTT client having the master authority controls a talk burst management procedure, the method for managing a talk burst in a PTT service system in accordance with the present invention can efficiently allocate a talk burst and smoothly control session establishment.

In addition, in the method for managing a talk burst in a PTT service system in accordance with the present invention, since a PTT client having the master authority can exclude a particular PTT client from session establishment, inconvenience that a session is re-established to exclude the particular PTT client from the session is eliminated.

In the present invention, the talk burst (floor control) management procedures can be informed to the user through audible, visual or tactile means or any combination thereof, such as outputting information on a display screen of the PTT terminal.

The present invention can be embodied as software, hardware, or a combination of both. For example, talk burst allocation method according to the present invention can be embodied as codes or commands in a software program that can be stored in a storage media (such as an internal memory of the user terminal, a flash memory, etc.) and that can be executed by a processor (such as a microprocessor within the user terminal).

Referring to FIG. 2, the present invention provides a server (220) of a group communication system (200), comprising: a transceiver (223) to send and receive communication signals; a processor (221) cooperating with the transceiver; and a storage medium (224) containing instructions (225, 226, 227) executable by the processor to perform the steps of, providing master authority to a particular user terminal, receiving floor control commands from the particular user terminal to handle floor control procedures for other user terminals having a session established thereof, and sending the floor control commands to the other terminals to perform floor control procedures.

The master authority can be provided to the particular user terminal that requested session establishment with other user terminals. Here, the floor control procedures can include providing floor grants and floor denials to one or more other user terminals, and the floor control procedures allow fair access to multiple user terminals. Also, the master authority can be transferred from the particular user terminal to a different user terminal, and the transferred master authority can be released and returned to the particular user terminal. Additionally, the group communication system supports a push-to-talk function.

Also referring to FIG. 2, the present invention provides a user terminal (210) of a group communication system (200), comprising: a transceiver (213) to send and receive communication signals; a processor (211) cooperating with the transceiver; and a storage medium (214) containing instructions (215, 216, 217) executable by the processor to perform the steps of, receiving master authority from a server and sending floor control commands to other user terminals via the server to handle floor control procedures for other user terminals having a session established thereof, or receiving floor control commands via the server from another user terminal that has been given master authority from the server.

The master authority can be received after requesting session establishment with other user terminals. The floor control procedures can include receiving floor grants and floor denials from the server, and the floor control procedures can allow fair access to multiple user terminals. Also, the received master authority can be transferred to a different user terminal, and the transferred master authority can be released and returned from the different user terminal. Additionally, the group communication system supports a push-to-talk function.

The features of the present invention are applicable to group (point-to-multipoint) communications, such as half-duplex communications like PTT (and PoC, which is a type of PTT), that allow voice and data communication to be transmitted upon activating a feature (e.g., by pushing a button, upon selecting a soft key, etc.) and allow voice and data communication to be received upon de-activating the feature (e.g., releasing the button, de-selecting the soft key, etc.).

Additionally, it can be clearly understood that the teachings and suggestions of the present invention can also be applicable and are intended to be applied to the so-called "Push-To-x" (PTx) techniques, because PTx is an enhancement of PTT and PoC technologies. Here, PTx refers to an enhanced version of PTT capable of supporting not only voice communications, but also various types of multimedia applications (e.g., photos, ringtones, games, content, SMS, MMS, etc.). An example of PTx is the so-called "Push-To View" (PTV) technology that can allow users to engage in multi-user video conferencing. PTx is expected to change the way we communicate when using mobile or wireless devices. The so-called "push-to" interface can be the main tool for connecting multiple users. Namely, the user's contact list (e.g., a so-called "buddy list") can be the center and starting point for the user's communication experience. By selecting a "push-to-x" function, the user will be able to launch various types of applications and communication sessions, including PTT, video conferencing, sending photos, and not to mention, placing ordinary phone calls. Each user's state of presence ("presence") will be an important component for the user to interface with his contact list. Namely, when the user activates the PTx function, a contact list containing various persons ("buddies") may be displayed with a list of options for each contact person based on their state of presence, capabilities of their mobile terminal or device, interoperability of their network, and the like. Here, the user may interface with his mobile terminal or wireless device through audible, visual, and/or tactile alerts or notifications.

Regarding the terminology used herein, it should be noted that PTT is also referred to as "P2T," and PTx is also referred to as "P2x," and PTV is also referred to as "P2V". Other similar abbreviations or acronyms may also be used to refer to the same basic concepts regarding various "push-to" techniques currently under development and to be newly developed in the near future.

As the present invention may involve communications through Internet access (e.g., VoIP), the features of the present invention are also intended to be applicable to enhanced Internet access services, such as the so-called "Broadband convergence Network (BcN)," which is expected to provide Internet access service with speeds of 50~100 Mbps, roughly 50 times faster than conventional broadband services.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for managing a talk burst in a group communication, the method comprising:
   a PTT (Push To Talk) server allocating master authority to a PTT client that requested session establishment; and
   the PTT client having been allocated master authority determining a management procedure by selecting at least one of a plurality of management procedures; and
   the PTT server controlling at least one specific PTT client established in a session with the PTT client having been allocated master authority according to the determined management procedure of the PTT client having master authority,
   wherein the plurality of management procedures comprise:
   allocating a talk burst once to each of the at least one specific PTT client established in the session with the PTT client having been allocated master authority,
   releasing the talk burst of a specific PTT client having previously been allocated the talk burst when the specific PTT client has exceeded use of the talk burst beyond a predetermined time,
   preventing the talk burst of the at least one specific PTT client,
   allocating master authority to a third party PTT client,
   releasing the talk burst allocation to the third party PTT client and allocating priority for a next talk burst to the PTT client having been allocated master authority.

2. A server of a group communication system, the server comprising:
   a transceiver to send and receive communication signals;
   a processor cooperating with the transceiver; and
   a storage medium storing instructions executable by the processor to perform:
   allocating master authority to a particular user terminal that requested session establishment with other user terminals,
   sending the floor control commands to the other terminals to perform the floor control procedures
   receiving floor control commands from the particular user terminal to handle floor control procedures for other the user terminals having a session established and,
   wherein the floor control commands are sent according to a management procedure determined by the particular user terminal from at least one of a plurality of management procedures,
   wherein the plurality of management procedures comprise:
   allocating a talk burst once to each of the other user terminals having the session established with the particular user terminal,
   releasing the talk burst of a specific one of the other user terminals having been previously allocated the talk burst when the specific one of the other user terminals has exceeded use of the talk burst beyond a predetermined time,
   preventing the talk burst of the other user terminals,
   allocating master authority to a third party terminal, and
   releasing the talk burst allocation to the third party terminal and allocating priority for another talk burst to the particular user terminal,
   and wherein the processor controls the other user terminals having a session established with the particular user terminal having master authority.

3. The server of claim 2, wherein the floor control procedures allow fair access to multiple user terminals.

4. The server of claim 2, wherein the master authority allocated to the third party terminal is released and returned to the particular user terminal.

5. The server of claim 2, wherein the group communication system supports a push-to-talk function.

6. A user terminal of a group communication system, the user terminal comprising:
   a transceiver to send and receive communication signals;
   a processor cooperating with the transceiver; and
   a storage medium storing instructions executable by the processor for,
   receiving master authority from a server after requesting session establishment with other user terminals, determining a floor control command from a plurality of floor control commands, and sending the floor control command to at least one other user terminal via the server to handle floor control procedures for at least one other user terminal having a session established with the user terminal, and wherein the plurality of floor control commands comprise:
   allocating a talk burst once to each of the at least one other user terminal having a session established with the user terminal,
   releasing the talk burst of a specific one of the other user terminals having been previously allocated the talk burst when the specific one of the other user terminals has exceeded use of the talk burst beyond a predetermined time,
   preventing the talk burst of one of the other user terminals, allocating master authority to a third party user terminal, and releasing the talk burst allocation to the third party user terminal and allocating priority for a next talk burst to the user terminal, and wherein the server controls the at least one other user terminal having a session established with the user terminal.

7. The user terminal of claim 6, wherein the floor control procedures allow fair access to multiple user terminals.

8. The user terminal of claim 6, wherein the master authority allocated to the third party user terminal is released and returned from the third party user terminal.

9. The user terminal of claim 6, wherein the group communication system supports a push-to-talk function.

* * * * *